United States Patent
Nakata

(10) Patent No.: US 9,028,712 B2
(45) Date of Patent: May 12, 2015

(54) OXYGEN SCAVENGER COMPOSITION, AND OXYGEN SCAVENGER PACKAGE USING THE SAME, AND METHOD FOR OXYGEN SCAVENGING

(75) Inventor: Takashi Nakata, Tokyo (JP)

(73) Assignee: Mitsubishi Gas Chemical Company, Inc., Tokyo (JP)

(*) Notice: Subject to any disclaimer, the term of this patent is extended or adjusted under 35 U.S.C. 154(b) by 0 days.

(21) Appl. No.: 13/820,593

(22) PCT Filed: Jun. 8, 2012

(86) PCT No.: PCT/JP2012/064798
§ 371 (c)(1),
(2), (4) Date: Mar. 4, 2013

(87) PCT Pub. No.: WO2012/169616
PCT Pub. Date: Dec. 13, 2012

(65) Prior Publication Data
US 2013/0153827 A1    Jun. 20, 2013

(30) Foreign Application Priority Data
Jun. 9, 2011    (JP) .................... 2011-128819

(51) Int. Cl.
| C09K 15/02 | (2006.01) |
| C09K 15/12 | (2006.01) |
| C09K 15/32 | (2006.01) |
| A23L 3/3436 | (2006.01) |
| B01J 20/04 | (2006.01) |
| B01J 20/32 | (2006.01) |
| B01J 20/28 | (2006.01) |

(52) U.S. Cl.
CPC .............. *C09K 15/02* (2013.01); *A23L 3/3436* (2013.01); *B01J 20/045* (2013.01); *B01J 20/046* (2013.01); *B01J 20/3204* (2013.01); *B01J 20/3236* (2013.01); *B01J 20/2805* (2013.01); *B01J 20/28052* (2013.01)

(58) Field of Classification Search
CPC ....... A23L 3/3436; B01J 20/04; B01J 20/045; B01J 20/046; B01J 20/3204; B01J 20/3236; B01D 53/14; C08K 9/02; C08K 2003/0856; C08K 2003/162; C08K 2003/166; C08K 2003/3045

USPC ........... 252/188.28, 181.6, 181.7, 188.2, 191, 252/192, 397

See application file for complete search history.

(56) References Cited

U.S. PATENT DOCUMENTS

| 4,127,503 A * | 11/1978 | Yoshikawa et al. ........... 502/401 |
| 4,166,807 A * | 9/1979 | Komatsu et al. ................ 502/62 |
| 4,192,773 A * | 3/1980 | Yoshikawa et al. ............. 502/62 |
| 5,889,093 A * | 3/1999 | Hatakeyama et al. .......... 524/80 |
| 6,133,361 A * | 10/2000 | Hatakeyama et al. ........ 206/524 |
| 2001/0048096 A1 * | 12/2001 | Sakamoto et al. ........ 252/188.28 |
| 2005/0034599 A1 * | 2/2005 | Nakata et al. .................... 95/138 |
| 2005/0079306 A1 | 4/2005 | Koyama et al. .............. 428/35.7 |
| 2008/0283037 A1 | 11/2008 | Dodo ........................ 126/263.02 |
| 2009/0095941 A1 | 4/2009 | Nakata et al. |

FOREIGN PATENT DOCUMENTS

| CN | 101304806 | 11/2008 |
| EP | 1 782 779 | 5/2007 |
| JP | 52-119488 | 10/1977 |
| JP | 56-078630 | 6/1981 |
| JP | 06-142502 | 5/1994 |
| JP | 10-309427 | 11/1998 |
| JP | 2000-343661 | 12/2000 |
| JP | 2004-330451 | 11/2004 |
| JP | 2008-253238 | 10/2008 |
| WO | 2006/006646 | 1/2006 |

OTHER PUBLICATIONS

International Search Report for PCT/JP2012/064798, Mailed on Sep. 11, 2012.
U.S. Appl. No. 13/814,313, filed Feb. 5, 2013.

* cited by examiner

*Primary Examiner* — Joseph D Anthony
(74) *Attorney, Agent, or Firm* — Greenblum & Bernstein, P.L.C.

(57) ABSTRACT

There are provided an oxygen scavenger composition and the like, which are excellent in economy in which the amount of oxygen absorbed per unit volume of the oxygen scavenger composition is large, and rusting at high humidity is inhibited. The oxygen scavenger composition of the present invention comprises (A) an iron powder, (B) a metal bromide and/or a metal iodide, and (C) a thiosulfate.

7 Claims, No Drawings

OXYGEN SCAVENGER COMPOSITION, AND OXYGEN SCAVENGER PACKAGE USING THE SAME, AND METHOD FOR OXYGEN SCAVENGING

TECHNICAL FIELD

The present invention relates to an oxygen scavenger composition, and more particularly to an oxygen scavenger composition in which the amount of oxygen absorbed per unit volume is large, and rusting at high humidity is inhibited.

BACKGROUND ART

An oxygen scavenger utilizing the oxidation reaction of an iron powder has already been widely utilized in order to maintain the quality and freshness of an article, such as food, by being hermetically sealed and housed in a gas barrier container together with the article, such as food, to remove oxygen in the container. This type of oxygen scavenger utilizes the reaction of an iron powder and oxygen in the coexistence of moisture, and, for example, one obtained by adding a metal halide to an iron powder in order to provide moisture absorption properties and promote the oxidation reaction is commercially available. However, a problem of an oxygen scavenger having such a constitution is that rusty water is produced (rusting) at high humidity and contaminates an article.

In order to solve this problem, an oxygen scavenger which is an oxygen scavenger composition containing an iron powder and a metal halide, in which an iron powder and a powder of electrolyte-containing calcium silicate, in which calcium silicate and calcium chloride are mixed, are mixed, and an oxygen scavenger in which a large amount of activated carbon is further blended into the above oxygen scavenger are proposed (see Patent Document 1).

On the other hand, a problem of an oxygen scavenger containing an iron powder as the base compound (substance to be oxidized) is that metal incorporation inspection cannot be conducted because the oxygen scavenger is responded by a metal detector. In order to avoid this, as an oxygen scavenger containing an inorganic compound as the base compound, for example, an oxygen scavenger composed of a first component composed of at least one of a thiosulfate and a polyhydric alcohol, a second component composed of an alkaline compound, a third component composed of at least one of aluminum, tin, and zinc, and a fourth component composed of at least one of water, water of crystallization, and water vapor is proposed (see Patent Document 2).

CITATION LIST

Patent Documents

Patent Document 1: Japanese Patent Laid-Open No. 6-142502
Patent Document 2: Japanese Patent Laid-Open No. 2008-253238

SUMMARY OF INVENTION

Technical Problem

However, in the technique described in the above Patent Document 1, a gyrolite type calcium silicate having a particular particle size distribution and having a petal-shaped structure is used, and therefore, the versatility and the economy are poor. In addition, in the technique described in the above Patent Document 1, two powders, the iron powder and the electrolyte-containing calcium silicate, are mixed, and electrolyte-containing calcium silicate having a large bulk specific gravity and particle diameter average is used in order to obtain a sufficient rusty water inhibition effect. A problem is that it is difficult to uniformly disperse two powders having largely different bulk specific gravities and particle diameters in this manner, and therefore, the nonuniformity may affect performance. Particularly, in a moisture-dependent oxygen scavenger composition, this problem is significant because bulk powders in a dry state are used during the preparation of the moisture-dependent oxygen scavenger composition. When electrolyte-containing calcium silicate having a small average particle diameter is used in order to avoid these problems, a problem is that the rusty water inhibition effect is insufficient, and the desired performance is not obtained. On the other hand, in the technique described in the above Patent Document 1, the generation of an offensive odor is inhibited by highly blending activated carbon. When activated carbon is highly blended in this manner, not only the problem of uniform dispersion described above occurs similarly, but also the amount of oxygen absorbed per unit volume decreases. Therefore, a problem is that the amount of the oxygen scavenger composition required to ensure the amount of oxygen absorbed equivalent to that of conventional articles increases, and as a result, the dimensions of the packaging material of an oxygen scavenger package increase, and the cost of the oxygen scavenger package increases further. Furthermore, in the technique described in the above Patent Document 1, classified electrolyte-containing calcium silicate and activated carbon are easily taken in the sealed portions of a package by being stirred up by static electricity when filling the package with the oxygen scavenger, or by being blown up together with air forced out from within the package when sealing the package, or the like. Therefore, the problem of sealing failure is likely to occur.

In addition, in the technique described in the above Patent Document 2, the thiosulfate or the polyhydric alcohol is used as the base compound, and therefore, a problem is that the cost is higher than that of an oxygen scavenger containing an iron powder as the base compound. In addition, the oxygen scavenger described in the above Patent Document 2 is the so-called self-reactive oxygen scavenger, and an oxygen absorption reaction starts immediately when the oxygen scavenger comes into contact with oxygen. Therefore, a problem is that in terms of preventing a decrease in oxygen absorption performance, deaeration and packaging work must be quickly conducted after the preparation of the bulk powders.

The present invention has been made in order to solve the above problems in the conventional techniques, and it is an object of the present invention to provide an oxygen scavenger composition excellent in economy in which the amount of oxygen absorbed per unit volume of the oxygen scavenger composition is large, and rusting at high humidity is inhibited.

Solution To Problem

The present inventors have diligently studied over and over in view of the above problems, and, as a result, found that by using an iron powder, a metal bromide and/or a metal iodide as metal halides, and a thiosulfate in combination, a oxygen scavenger composition excellent in versatility and economy in which the amount of oxygen absorbed per unit volume is large, and rusting at high humidity is inhibited is obtained, thus arriving at the present invention.

Specifically, the present invention provides the following <1> to <9>.

<1> An oxygen scavenger composition comprising (A) an iron powder, (B) a metal bromide and/or a metal iodide, and (C) a thiosulfate.
<2> The oxygen scavenger composition according to the above <1>, wherein at least part of a surface of the (A) is coated with the (B) and the (C).
<3> The oxygen scavenger composition according to the above <1> or <2>, wherein a content of the (B) is 0.01 to 5 parts by weight based on 100 parts by weight of the (A).
<4> The oxygen scavenger composition according to any one of the above <1> to <3>, wherein a molar ratio of the (C) to the (B) is (C)/(B)=0.2 to 5.
<5> The oxygen scavenger composition according to any one of the above <1> to <4>, wherein a metal of the (B) is an alkali metal or an alkaline-earth metal.
<6> The oxygen scavenger composition according to any one of the above <1> to <5>, wherein (C) the thiosulfate is an alkali metal salt or alkaline-earth metal salt of thiosulfuric acid.
<7> The oxygen scavenger composition according to any one of the above <1> to <6>, wherein the oxygen scavenger composition is a moisture-dependent composition.
<8> An oxygen scavenger package obtained by packaging the oxygen scavenger composition according to any one of the above <1> to <7> in an air-permeable packaging material.
<9> A method for oxygen scavenging an inside of a gas barrier container at a high humidity of 70 to 100% RH using the oxygen scavenger package according to the above <8>.

Advantageous Effects of Invention

The present invention implements an oxygen scavenger composition in which, although an iron powder excellent in versatility and economy is used as the base compound, the amount of oxygen absorbed per unit volume is large, and rusting at high humidity can be significantly inhibited. Therefore, by using this oxygen scavenger composition, not only the contamination of contents by rusty water can be inhibited, but also further cost reduction is promoted. In addition, when a moisture-dependent oxygen scavenger composition which does not comprise a hydrous substance, such as zeolite, pearlite, diatomaceous earth, or silica gel, water, or the like and in which oxygen scavenging performance is highly activated only after the oxygen scavenger composition comes into contact with water in the external environment or is exposed to a high humidity environment is provided, long work time can be taken in a normal temperature and normal humidity environment, and therefore, the workability can be increased.

DESCRIPTION OF EMBODIMENT

An embodiment of the present invention will be described below. The following embodiment is an illustration for explaining the present invention, and the present invention is not limited only to the embodiment.

An oxygen scavenger composition in this embodiment contains (A) an iron powder, (B) a metal bromide and/or a metal iodide, and (C) a thiosulfate.

(A) Iron Powder

The iron powder that is the base compound of the oxygen scavenger composition is not particularly limited as long as the surface of iron is exposed. Iron powders publicly known in the industry, for example, reduced iron powders, electrolytic iron powders, and atomized iron powders, are preferably used. In addition, ground materials, cut articles, and the like of cast iron and the like can also be used. One of these can be used alone, or two or more of these can be used in combination. In addition, generally, the iron powder preferably has an average particle diameter (D50) of 1 mm or less, more preferably 500 μm or less, and further preferably 100 μm or less, in order to make contact with oxygen good. The lower limit of the average particle diameter of the iron powder is not particularly limited, and is preferably 10 μm or more considering handling properties.

(B) Metal Bromide And Metal Iodide

In this embodiment, a metal bromide and/or a metal iodide as metal halides are used. As these metals, alkali metals or alkaline-earth metals are preferred. Specific examples of the metal bromide and the metal iodide include sodium bromide, potassium bromide, calcium bromide, magnesium bromide, sodium iodide, potassium iodide, calcium iodide, and magnesium iodide. One of these can be used alone, or two or more of these can be used in combination. According to the findings of the present inventors, it has become clear that when a metal chloride, such as sodium chloride, calcium chloride, or magnesium chloride, is used as the metal halide, the amount of oxygen absorbed is not sufficient, and the rusting inhibition effect is also not sufficient. Therefore, in the oxygen scavenger composition in this embodiment, the use of the metal bromide or the metal iodide as the metal halide is essential.

The content of the metal bromide and the metal iodide can be appropriately set according to the desired performance, and is not particularly limited. In terms of increasing the amount of oxygen absorbed and the oxidation reaction rate, the content of the metal bromide and the metal iodide is preferably in the range of 0.01 to 5 parts by weight, more preferably 0.4 to 2 parts by weight, for the total of both, based on 100 parts by weight of the iron powder.

(C) Thiosulfate

In this embodiment, by using the thiosulfate with the above-described metal bromide and/or metal iodide, the oxidation reaction rate of the iron powder is specifically improved, and rusting at high humidity is significantly inhibited. The reason why the oxidation reaction rate of the iron powder is specifically improved, and the reason why rusting at high humidity is significantly inhibited are not clear, but as one of reasons, it is inferred that the thiosulfate inhibits the dissolution of an oxidation product. As the thiosulfate used here, thiosulfates of alkali metals or alkaline-earth metals are preferably used. Specific examples of the thiosulfates include sodium thiosulfate, potassium thiosulfate, calcium thiosulfate, and magnesium thiosulfate. One of these can be used alone, or two or more of these can be used in combination. According to the findings of the present inventors, it has become clear that when a sulfate or a sulfite is used, the amount of oxygen absorbed is not sufficient. Therefore, in the oxygen scavenger composition in this embodiment, the use of the thiosulfate is essential.

The content of the thiosulfate can be appropriately set according to the desired performance, and is not particularly limited. In terms of increasing the amount of oxygen absorbed and further inhibiting the bleeding of rusty water from the oxygen scavenger composition, the molar ratio of the thiosulfate to the total of the metal bromide and/or the metal iodide is preferably the thiosulfate/(the total of the metal bromide and the metal iodide)=0.2 to 5, more preferably 0.5 to 2.

The oxygen scavenger composition in this embodiment may contain additives publicly known in the industry, as required, in addition to the above (A) to (C). For example, for the purposes of bad odor prevention, dust inhibition, microwave resistance, hydrogen production inhibition, and the like, silica, alumina, activated carbon, baking soda, and the like can be appropriately blended.

When the oxygen scavenger composition in this embodiment contains these additives, the size of an oxygen scavenger package increases, and the amount of an air-permeable packaging material used constituting the oxygen scavenger package increases, and therefore, it is desired that the amount added is the minimum required. The specific amount added is not particularly limited, and is preferably 0 to 35 parts by weight, more preferably 0 to 25 parts by weight, based on 100 parts by weight of the total amount of the iron powder, the metal bromide and the metal iodide, and the thiosulfate. Conventionally, the dispersibility of an iron powder has also been increased by blending a vegetable oil, an animal oil, a silicone oil, or the like into an oxygen scavenger composition. But, if oils are blended in this manner, the surface of the iron powder may be coated with a uniform film of the oil to significantly deteriorate the oxygen absorption ability. Therefore, the oxygen scavenger composition in this embodiment preferably does not contain these oils. Here, "the oxygen scavenger composition does not contain an oil" means that the content of an oil is less than 3% by mass, more preferably less than 1% by mass, further preferably less than 0.5% by mass, particularly preferably less than 0.1% by mass, and most preferably 0.0% by mass, based on the total amount of the oxygen scavenger composition.

Particularly, in the case of use under high humidity conditions, an inorganic filler, such as silica or alumina, is added to conventional oxygen scavenger compositions in order to maintain the rusting inhibition ability. But, in the oxygen scavenger composition in this embodiment, the rusting inhibition ability under high humidity conditions is significantly increased. Therefore, even in the case of use under high humidity conditions, the addition of an inorganic filler, such as silica or alumina, can be greatly reduced or omitted, and the amount of a very expensive air-permeable packaging material used can be greatly reduced with respect to the oxygen scavenger composition. Therefore, the cost of the entire product is especially reduced. In this manner, the oxygen scavenger composition in this embodiment preferably does not substantially contain an inorganic filler, but may contain some amount of an inorganic filler in order to maintain and enhance the rusting inhibition ability. In terms of these, the content of the inorganic filler may be appropriately set according to the desired performance, and is not particularly limited, and is preferably 0 to 30 parts by weight, more preferably 0 to 20 parts by weight, further preferably 0 to 10 parts by weight, particularly preferably 0 to 5 parts by weight, and most preferably 0 to 3 parts by weight, based on 100 parts by weight of the total amount of the iron powder, the metal bromide and the metal iodide, and the thiosulfate.

The form of the oxygen scavenger composition in this embodiment is not particularly limited as long as the oxygen scavenger composition contains the above-described three components. The oxygen scavenger composition can take any form. For example, the oxygen scavenger composition may be a mixture of three powders, namely, an iron powder, a powder in which a metal bromide or a metal iodide is supported on a support, and a powder in which a thiosulfate is supported on a support. In terms of further increasing the amount of oxygen absorbed and further inhibiting rusting at high humidity, preferably either of the thiosulfate and the metal bromide or the metal iodide, more preferably both, adheres to the surface of the iron powder. In other words, the oxygen scavenger composition in this embodiment more preferably has a powder shape in which at least part or all of the surface of a coated powder-shaped iron powder is coated with a thiosulfate and a metal bromide or a metal iodide.

The oxygen scavenger composition in this embodiment can be used as an oxygen scavenger package by filling and packaging the oxygen scavenger composition using an air-permeable packaging material on part or the entire surface. The air-permeable packaging material used at this time is not particularly limited as long as it is a packaging material used for oxygen scavenger applications. The air-permeable packaging material is desirably a packaging material having air permeability as high as possible in order to obtain a sufficient oxygen absorption effect. Examples of the air-permeable packaging material can include paper, such as Japanese paper, machine-made paper, and rayon paper, nonwoven fabrics using various fibers, such as fibers of pulp, cellulose, and synthetic resins, plastic films or perforated plastic films, or microporous films obtained by adding calcium carbonate and the like and then performing stretching, or further, laminates of two or more selected from these. As such ones, nonwoven fabrics composed of polyethylene, or laminates of nonwoven fabrics and microporous films are preferred.

Further, by blending the oxygen scavenger composition in this embodiment into a thermoplastic resin, a film or sheet-shaped oxygen scavenger can be provided. Such a film or sheet-shaped oxygen scavenger can be used, as it is, or covered with an air-permeable material. In addition, it can also be used as the oxygen absorbing layer of an oxygen scavenging multilayer body.

The oxygen scavenger composition in this embodiment or an oxygen scavenger package obtained by filling and packaging the oxygen scavenger composition with an air-permeable packaging material can be hermetically sealed and stored in a gas barrier container together with an article. The shape and material of the gas barrier container used here is not limited as long as it can be hermetically sealed and substantially has gas barrier properties, for example, metal cans, glass bottles, plastic containers, and bags. In addition, packaging containers and bags composed of laminates having an oxygen permeability of 0.05 to 20 mL/m$^2$·24 hr·atm (25° C., 50% RH), illustrated by multilayer sheets and films of polyethylene terephthalate/vapor-deposited aluminum/polyethylene, stretched polypropylene/polyvinyl alcohol/polyethylene, polyvinylidene chloride-coated stretched nylon/polyethylene, and the like, and nylon-based coextruded multilayer sheets and films, can be conveniently used.

The oxygen scavenger composition in this embodiment not only has excellent oxygen absorption properties, but also can inhibit the migration of rusty water to the outside because the occurrence of rusting at high humidity is inhibited. Therefore, particularly, the oxygen scavenger composition in this embodiment preferably performs deoxidation even at a high humidity of 70 to 100% RH, and therefore can also be preferably used in applications where moisture resistance is required. The amount of oxygen absorbed per 1 mL of the oxygen scavenger composition in this embodiment is not particularly limited, and is preferably 500 mL/mL or more, more preferably 600 mL/mL or more, and particularly preferably 700 mL/mL or more. The upper limit value of the amount of oxygen absorbed is not particularly limited. A larger amount of oxygen absorbed is desired, and 1250 mL/mL or less is preferred. The method for measuring the amount of oxygen absorbed is performed by the method described in Examples.

EXAMPLES

The present invention will be described below in more detail by giving Examples and Comparative Examples. The present invention is not limited in any way by these Examples.

In the following Examples, for metal halides, thiosulfates, and sulfates, reagents manufactured by Wako Pure Chemical Industries, Ltd. were used, and for sulfites, reagents manufactured by Wako Pure Chemical Industries, Ltd. or KISHIDA CHEMICAL Co., Ltd. were used.

<Method For Fabricating Oxygen Scavenger Package>

1.40 g Of an oxygen scavenger composition was filled in a small bag of an air-permeable packaging material having dimensions of 40 mm×37 mm, and then sealed on four-sides, to fabricate an oxygen scavenger package. The air-permeable packaging material is composed of a non-air-permeable laminated film composed of PET/LLDPE on one surface and a polyethylene nonwoven fabric on one surface.

<Method For Measuring Amount of Oxygen Absorbed>

The oxygen scavenger package and cotton containing 10 mL of water were placed in a gas barrier bag of a 250 mm×400 mm laminate film of polyvinylidene chloride-coated stretched nylon/polyethylene, hermetically sealed together with 3000 mL of air, and stored at 25° C. After 7 days, the amount of oxygen absorbed for the oxygen scavenger package was measured using a zirconia type oxygen concentration meter, and the amount of oxygen absorbed per 1 mL of the oxygen scavenger composition was calculated.

<Method For Evaluating Rusting State>

One short side (37 mm) of the oxygen scavenger package was held by hand, and the oxygen scavenger package was shaken to move the internal oxygen scavenger composition to the opposed one side in the package. The above oxygen scavenger package was placed on cotton containing 10 mL of water via a polypropylene net, and fixed with tape. Next, holes having a diameter of 2 mm were made in four places in a 150 mm×180 mm gas barrier bag composed of a laminate film of polyvinylidene chloride-coated stretched nylon/polyethylene, and the oxygen scavenger package was placed in this gas barrier bag in which the holes were made, and sealed. This sample was suspended and stored at 25° C., and the state of the formation of rust forming on the packaging surface of the oxygen scavenger package was periodically observed.

Example 1

An aqueous solution in which 3 mmol of sodium bromide as a metal halide and 3 mmol of sodium thiosulfate as a thiosulfate were dissolved in 6.17 g of water was prepared. This aqueous solution was added to 100 g of an iron powder (average particle diameter: 50 μm) with mixing, and then, the mixture was dried to obtain an oxygen scavenger composition in which the sodium bromide and the sodium thiosulfate adhered to the surface of the iron powder.

An oxygen scavenger package was fabricated using the obtained oxygen scavenger composition, and the measurement of the amount of oxygen absorbed and the evaluation of a rusting state were performed. The results are shown in Table 1.

Examples 2 to 9

Operation was performed as in Example 1 except that for the metal halide and the thiosulfate, those shown in Table 1 were used, to obtain oxygen scavenger compositions in which the metal halide and the thiosulfate adhered to the surface of the iron powder.

Oxygen scavenger packages were fabricated using the obtained oxygen scavenger compositions, and the measurement of the amount of oxygen absorbed and the measurement of a rusting state were performed. The results are shown in Table 1.

Comparative Examples 1 to 3

Operation was performed as in Example 1 except that the blending of the thiosulfate was omitted, and metal halides shown in Table 1 were used, to obtain oxygen scavenger compositions.

Oxygen scavenger packages were fabricated using the obtained oxygen scavenger compositions, and the measurement of the amount of oxygen absorbed and the measurement of a rusting state were performed. The results are shown in Table 1.

Comparative Examples 4 to 7

Operation was performed as in Example 1 except that instead of the thiosulfate, sulfites or sulfates shown in Table 1 were used, to obtain oxygen scavenger compositions.

Oxygen scavenger packages were fabricated using the obtained oxygen scavenger compositions, and the measurement of the amount of oxygen absorbed and the measurement of a rusting state were performed. The results are shown in Table 1.

Comparative Examples 8 to 9

Operation was performed as in Examples 1 and 2 except that instead of sodium bromide, sodium chloride, which was a metal chloride, was used, to obtain oxygen scavenger compositions.

Oxygen scavenger packages were fabricated using the obtained oxygen scavenger compositions, and the measurement of the amount of oxygen absorbed and the measurement of a rusting state were performed. The results are shown in Table 1.

Comparative Examples 10 to 11

Operation was performed as in Examples 1 and 2 except that the blending of the metal halide was omitted, to obtain oxygen scavenger compositions.

Oxygen scavenger packages were fabricated using the obtained oxygen scavenger compositions, and the measurement of the amount of oxygen absorbed and the measurement of a rusting state were performed. The results are shown in Table 1.

Comparative Examples 12 to 17

Operation was performed as in Example 1 except that the blending of the iron powder was omitted, and metal halides and thiosulfates shown in Table 1 were used, to obtain oxygen scavenger compositions.

Oxygen scavenger packages were fabricated using the obtained oxygen scavenger compositions, and the measurement of the amount of oxygen absorbed and the measurement of a rusting state were performed. The results are shown in Table 1.

Comparative Examples 18 to 19

Operation was performed as in Examples 1 and 2 except that the blending of the iron powder and the metal halide was omitted, to obtain oxygen scavenger compositions.

Oxygen scavenger packages were fabricated using the obtained oxygen scavenger compositions, and the measurement of the amount of oxygen absorbed and the measurement of a rusting state were performed. The results are shown in Table 1.

TABLE 1

| | (A) Iron powder [g] | (B) Metal halide[1] | (C) Thiosulfate, sulfite, or sulfate[1] | Amount of oxygen absorbed[2] [mL/mL—oxygen scavenger composition] | Rusting state[3] After 7 days | After 14 days | After 21 days | Remarks |
|---|---|---|---|---|---|---|---|---|
| Example 1 | 100 | NaBr | $Na_2S_2O_3$ | 799 | − | − | − | (A) + (B) + (C) |
| Example 2 | | | $MgS_2O_3$ | 792 | − | − | − | |
| Example 3 | | $MgBr_2$ | $Na_2S_2O_3$ | 709 | − | − | − | |
| Example 4 | | | $MgS_2O_3$ | 857 | − | − | − | |
| Example 5 | | $CaBr_2$ | $Na_2S_2O_3$ | 845 | − | − | − | |
| Example 6 | | | $MgS_2O_3$ | 850 | − | − | − | |
| Example 7 | | | $K_2S_2O_3$ | 850 | − | − | − | |
| Example 8 | | NaI | $Na_2S_2O_3$ | 695 | − | − | − | |
| Example 9 | | | $MgS_2O_3$ | 702 | − | − | − | |
| Comparative Example 1 | | NaBr | None | 447 | − | + | * | No (C) |
| Comparative Example 2 | | $MgBr_2$ | | 852 | − | + | * | |
| Comparative Example 3 | | NaI | | 340 | * | * | * | |
| Comparative Example 4 | | NaBr | $Na_2SO_3$ | 595 | | | | (C) was sulfite or sulfate |
| Comparative Example 5 | | | $Na_2SO_4$ | 549 | | | | |
| Comparative Example 6 | | | $MgSO_3$ | 595 | | | | |
| Comparative Example 7 | | | $MgSO_4$ | 566 | | | | |
| Comparative Example 8 | | NaCl | $Na_2S_2O_3$ | 423 | | | | (B) was metal chloride |
| Comparative Example 9 | | | $MgS_2O_3$ | 461 | | | | |
| Comparative Example 10 | | None | $Na_2S_2O_3$ | 357 | | | | No (B) |
| Comparative Example 11 | | | $MgS_2O_3$ | 265 | | | | |
| Comparative Example 12 | 0 | NaBr | $Na_2S_2O_3$ | 0 | | | | No (A) |
| Comparative Example 13 | | | $MgS_2O_3$ | 0 | | | | |
| Comparative Example 14 | | $MgBr_2$ | $Na_2S_2O_3$ | 0 | | | | |
| Comparative Example 15 | | | $MgS_2O_3$ | 0 | | | | |
| Comparative Example 16 | | NaI | $Na_2S_2O_3$ | 0 | | | | |
| Comparative Example 17 | | | $MgS_2O_3$ | 0 | | | | |
| Comparative Example 18 | | None | $Na_2S_2O_3$ | 0 | | | | No (A) and (B) |
| Comparative Example 19 | | | $MgS_2O_3$ | 0 | | | | |

[1] 3 mmol of each of the metal halide, and the thiosulfate, the sulfite, or the sulfate was used.
[2] The amount of oxygen absorbed (per 1 mL of the oxygen scavenger composition) at 25° C. and 100% RH after 7 days.
[3] The rusting state was determined according to the following criteria.
−: the formation of rust was not observed
±: one to two minute rusts as if pricked by a needle tip that were not noticed unless closely looked at formed
+: many minute rusts as if pricked by a needle tip that were not noticed unless closely looked at formed
*: a large rust that did not apply to ± or + formed, which would be transferred to a stored article and contaminate the article As is clear from Table 1, in Examples 1 to 9 containing all of (A) the iron powder, (B) the metal bromide and/or the metal iodide, and (C) the thiosulfate, very large amounts of oxygen absorption were shown, and the formation of rust was not observed for 21 days in all samples.

On the other hand, in Comparative Examples 1 to 3 not containing (C) the thiosulfate, rusting was confirmed after 7 to 14 days. From these, it became clear that by containing (C) the thiosulfate together with (A) the iron powder and (B) the metal bromide and/or the metal iodide, rusting was significantly inhibited.

In addition, in Comparative Examples 4 to 7 using the sulfites or the sulfates instead of (C) the thiosulfate, Comparative Examples 8 to 9 using the metal chloride instead of (B) the metal bromide and/or the metal iodide, and Comparative Examples 10 to 11 not using (B) the metal bromide and/or the metal iodide, the amount of oxygen absorbed was greatly smaller than that of the Examples. From these, it was shown that an oxygen absorption effect and a rusting inhibition effect were both achieved at high levels only after (B) the metal bromide or the metal iodide and (C) the thiosulfate were used with (A) the iron powder.

Further, in Comparative Examples 12 to 19 not comprising (A) the iron powder, oxygen was not absorbed at all.

Examples 10 to 19 and Comparative Examples 20 to 23

Operation was performed as in Example 1 except that the type of the metal halide and the amount of the thiosulfate were changed as shown in Table 2, to obtain oxygen scavenger compositions.

Oxygen scavenger packages were fabricated using the obtained oxygen scavenger compositions, and the measurement of the amount of oxygen absorbed and the measurement of a rusting state were performed. The results are shown in Table 2.

INDUSTRIAL APPLICABILITY

As described above, in the oxygen scavenger composition, and the oxygen scavenger package using the same, and the method for oxygen scavenging according to the present invention, not only the amount of oxygen absorbed per unit volume is large, but also rusting at high humidity is significantly inhibited. Therefore, they can be utilized widely and effectively as oxygen scavengers in a wide range of fields where the creation of low oxygen concentration environments is required, and can be especially effectively utilized in oxygen scavenging applications in high humidity environments, for example, the long-term storage of food, such as rice cake, cooked rice, ham, and cooked food.

This application claims priority from Japanese Patent Application No. 2011-128819 filed with the Japan Patent Office on Jun. 9, 2011, the content of which is incorporated herein by reference.

The invention claimed is:

1. An oxygen scavenger composition comprising (A) an iron powder, (B) a metal bromide in an amount of 0.4 to 5 parts by weight based on 100 parts by weight of (A), and (C) a thio sulfate,
    wherein at least part of a surface of (A) is coated with (B) and (C).

2. The oxygen scavenger composition according to claim 1,
    wherein a molar ratio of the (C) to the (B) is (C)/(B)=0.2 to 5.

3. The oxygen scavenger composition according to claim 1,
    wherein a metal of the (B) is an alkali metal or an alkaline-earth metal.

4. The oxygen scavenger composition according to claim 1,
    wherein (C) the thiosulfate is an alkali metal salt or alkaline-earth metal salt of thio sulfuric acid.

TABLE 2

| | Metal halide | | Thiosulfate[1] [mmol] | Thiosulfate/metal halide [molar ratio] | Amount of oxygen absorbed[2] [mL/mL— oxygen scavenger composition] | Rusting state[3] | | |
|---|---|---|---|---|---|---|---|---|
| | Type | Amount [mmol] | | | | After 7 days | After 14 days | After 21 days |
| Example 10 | NaBr | 1 | 5 | 5 | 709 | − | − | − |
| Example 11 | | 2 | 4 | 2 | 770 | − | − | − |
| Example 12 | | 3 | 3 | 1 | 777 | − | − | − |
| Example 13 | | 4 | 2 | 0.5 | 835 | − | − | − |
| Example 14 | | 5 | 1 | 0.2 | 777 | − | − | − |
| Comparative Example 20 | | 6 | 0 | 0 | 672 | − | + | * |
| Comparative Example 21 | | 0 | 6 | − | 413 | | | |
| Example 15 | CaBr$_2$ | 1 | 5 | 5 | 763 | − | − | − |
| Example 16 | | 2 | 4 | 2 | 865 | − | − | − |
| Example 17 | | 3 | 3 | 1 | 845 | − | − | − |
| Example 18 | | 4 | 2 | 0.5 | 877 | − | − | − |
| Example 19 | | 5 | 1 | 0.2 | 799 | − | − | − |
| Comparative Example 22 | | 6 | 0 | 0 | 631 | − | + | * |
| Comparative Example 23 | | 0 | 6 | − | 413 | | | |

[1]For the thiosulfate, sodium thiosulfate was used.
[2]The amount of oxygen absorbed (per 1 mL of the oxygen scavenger composition) at 25° C. and 100% RH after 7 days.
[3]The rusting state was determined according to the following criteria.
−: the formation of rust was not observed
±: one to two minute rusts as if pricked by a needle tip that were not noticed unless closely looked at formed
+: many minute rusts as if pricked by a needle tip that were not noticed unless closely looked at formed
*: a large rust that did not apply to ± or + formed, which would be transferred to a stored article and contaminate the article 5. The oxygen scavenger composition according to claim 1,
wherein the oxygen scavenger composition is a moisture-dependent oxygen scavenger composition.

6. An oxygen scavenger package obtained by packaging the oxygen scavenger composition according to claim 1 in an air-permeable packaging material.

7. A method for oxygen scavenging an inside of a gas barrier container at a high humidity of 70 to 100% RH using the oxygen scavenger package according to claim 6.

* * * * *